(12) United States Patent
Shen et al.

(10) Patent No.: US 11,740,032 B2
(45) Date of Patent: Aug. 29, 2023

(54) METHOD FOR ENHANCING THERMAL ENERGY STORAGE PERFORMANCE OF INDUSTRIAL GRADE HYDRATED SALTS BASED ON PHASE CHANGE

(71) Applicant: Qinghai Institute of Salt Lakes, Chinese Academy of Sciences, Xining (CN)

(72) Inventors: Yue Shen, Xining (CN); Yuan Zhou, Xining (CN); Xiang Li, Xining (CN); Shengdi Zhang, Xining (CN); Chunxi Hai, Xining (CN); Yanxia Sun, Xining (CN); Jinbo Zeng, Xining (CN); Xiufeng Ren, Xining (CN)

(73) Assignee: QINGHAI INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

(21) Appl. No.: 17/851,693

(22) Filed: Jun. 28, 2022

(65) Prior Publication Data

US 2023/0010352 A1 Jan. 12, 2023

(30) Foreign Application Priority Data

Jun. 30, 2021 (CN) .......................... 202110739956.3

(51) Int. Cl.
*F28D 20/02* (2006.01)
*C09K 5/04* (2006.01)
*C09K 5/06* (2006.01)
*G01N 25/48* (2006.01)

(52) U.S. Cl.
CPC .............. *F28D 20/02* (2013.01); *C09K 5/044* (2013.01); *C09K 5/063* (2013.01); *G01N 25/4893* (2013.01)

(58) Field of Classification Search
CPC ......... F28D 20/02; C09K 5/044; C09K 5/063; G01N 25/4893; Y02E 60/14
See application file for complete search history.

(56) References Cited

U.S. PATENT DOCUMENTS

| 2016/0305716 | A1* | 10/2016 | Bertin | ...................... F28D 20/02 |
| 2017/0283674 | A1* | 10/2017 | Ramesh | .................. C01B 21/48 |
| 2021/0147736 | A1* | 5/2021 | Zahir | ...................... F28D 20/02 |

* cited by examiner

*Primary Examiner* — Andrew J. Oyer
(74) *Attorney, Agent, or Firm* — WPAT, P.C

(57) ABSTRACT

Disclosed is a method for enhancing thermal energy storage performance of industrial grade hydrated salts based on phase change, comprising: heating an aqueous system of industrial grade hydrated salts containing 105-130 percent (%) by mass of $m_0$ industrial grade hydrated salt to $m_0$, taking a sample for differential scanning calorimeter testing and recording its melting enthalpy as $\Delta H_1$; melting and adding water into, or melting and evaporating the residual aqueous system of industrial grade hydrated salts or the residual industrial grade hydrated salts system with a mass of $m_1$ to increase or decrease the mass by 0.4-0.8% $m_0$ until a melting enthalpy $\Delta H_n$ of a sample that taken from the residual aqueous system of industrial grade hydrated salts with a mass of $m_n$ satisfies $\Delta H_2 < \ldots < \Delta H_n > \Delta H_{n+1}$.

11 Claims, 13 Drawing Sheets

METHOD FOR ENHANCING THERMAL ENERGY STORAGE PERFORMANCE OF INDUSTRIAL GRADE HYDRATED SALTS BASED ON PHASE CHANGE

CROSS-REFERENCE TO RELATED APPLICATIONS

This application claims priority to Chinese Patent Application No. 202110739956.3, filed on Jun. 30, 2021, the contents of which are hereby incorporated by reference.

TECHNICAL FIELD

The present application belongs to the technical field of phase change materials, and specifically relates to a method for enhancing thermal energy storage performance of industrial grade hydrated salts based on phase change.

BACKGROUND

A problem that exists in the current chemical by-product of Qaidam Salt Lake is the low latent heat during a phase change of bischofite, which seriously affects the density of latent heat storage of the material when being used as a phase change material for hydrated salt systems.

While an existing method for improving the latent heat storage performance of the chemical by-product bischofite at Qaidam Salt Lake is mainly through conventional recrystallization with a processing route of A→B→C→D (as shown in FIG. 1), where industrial bischofite is firstly dissolved in water, then insoluble impurities are filtered off to obtain diluted solution (FIG. 1: point A), then the solution is evaporated and concentrated (FIG. 1: B→C) by heating up (FIG. 1: A→B) while controlling the final concentration to be under 46.84 percent (%), and the solution after evaporation (point C) is cooled to room temperature (point D) to obtain a product $MgCl_2 \cdot 6H_2O$ and a mother liquid, and solid $MgCl_2 \cdot 6H_2O$ is obtained by suction filtration and drying; still, the dried $MgCl_2 \cdot 6H_2O$ contains a small amount of intercrystalline brine.

Although the latent heat storage performance of industrial grade bischofite is improved by the current conventional recrystallization method, the latent heat of phase change (melting enthalpy) of $MgCl_2 \cdot 6H_2O$ is still lower than that of $MgCl_2 \cdot 6H_2O$ with analytical purity or superior purity due to the small amount of intercrystalline brine that remains in the dried $MgCl_2 \cdot 6H_2O$ (FIG. 3-FIG. 5), indicating that the performance of latent heat storage of $MgCl_2 \cdot 6H_2O$ can still be improved.

SUMMARY

To achieve the aforementioned objective of the present application, the present application provides a method for enhancing thermal energy storage performance of industrial grade hydrated salts based on phase change, including the steps as follows:

S1: heating an aqueous system of industrial grade hydrated salts containing industrial grade hydrated salt of 105-130% of $m_0$ by mass, and taking a sample No. 1 from the system for differential scanning calorimeter (DSC) testing when the mass of the aqueous system of industrial grade hydrated salts is reduced to $m_0$, recording a melting enthalpy of sample No. 1 as $\Delta H_1$ and the mass of the remaining industrial grade hydrated salts aqueous solution as $m_1$; or, heating and melting a recrystallized industrial grade hydrated salts system of mass $m_0$, taking a sample No. 1 for DSC testing and recording the melting enthalpy of sample No. 1 as $\Delta H_1$ and the mass of the remaining industrial grade hydrated salts system as $m_1$; and S2: melting and adding water into, or melting and evaporating the residual aqueous system of industrial grade hydrated salts or the residual industrial grade hydrated salts system with the mass of $m_1$ in step S1 to increase or decrease the mass by 0.4-0.8% $m_0$, then taking a sample No. 2 from the residual system for DSC testing and recording the melting enthalpy of the sample No. 2 as $\Delta H_2$, and taking the mass of the residual aqueous system of industrial grade hydrated salts or residual industrial grade hydrated salts system as $m_2$; then repeating the melting and adding water or melting and evaporating process until a melting enthalpy $\Delta H_n$ of a sample No. n taken from the residual aqueous system of industrial grade hydrated salts or residual industrial grade hydrated salts system with a mass of $m_n$ satisfies $\Delta H_2 < \ldots < \Delta H_n > \Delta H_{n+1}$, or the difference between $\Delta H_n$ and $\Delta H_{GR}$ is in a range of −5-5 Joule (J/g), where the residual aqueous system of industrial grade hydrated salts or the residual industrial grade hydrated salts system with the mass of $m_n$ is confirmed to be a desired industrial hydrated salts system with improved phase change thermal energy storage performance, with $\Delta H_n$ being the melting enthalpy of sample No. n+1, and $\Delta H_{GR}$ being the melting enthalpy of superior purity hydrated salts, n ☐2.

Compared with the prior art, the beneficial effect of the present application is that, in response to the drawback that the existing recrystallization method does not enhance the latent heat storage capacity of industrial grade hydrated salt (bischofite) to a sufficient degree (still lower than analytical purity hydrated salt after recrystallization), the present application provides a method combining DSC and stepping evaporation (or stepping dilution) to prepare hydrated salts ($MgCl_2 \cdot 6H_2O$); and the hydrated salts obtained, although still containing relatively high levels of salt lake impurities compared to the analytical purity, still has a latent heat storage capacity improved to a level comparable to that of the superior purity.

BRIEF DESCRIPTION OF THE DRAWINGS

In order to more clearly illustrate the technical schemes in the embodiments or prior art of the present application, the following is a brief description of the drawings required for the description of the embodiments or prior art, it is clear that the drawings in the following description are only some of the embodiments documented in the present application, and that other drawings may be obtained from these drawings without creative efforts by a person of ordinary skill in the art.

DETAILED DESCRIPTION OF THE EMBODIMENTS

Figure 1:
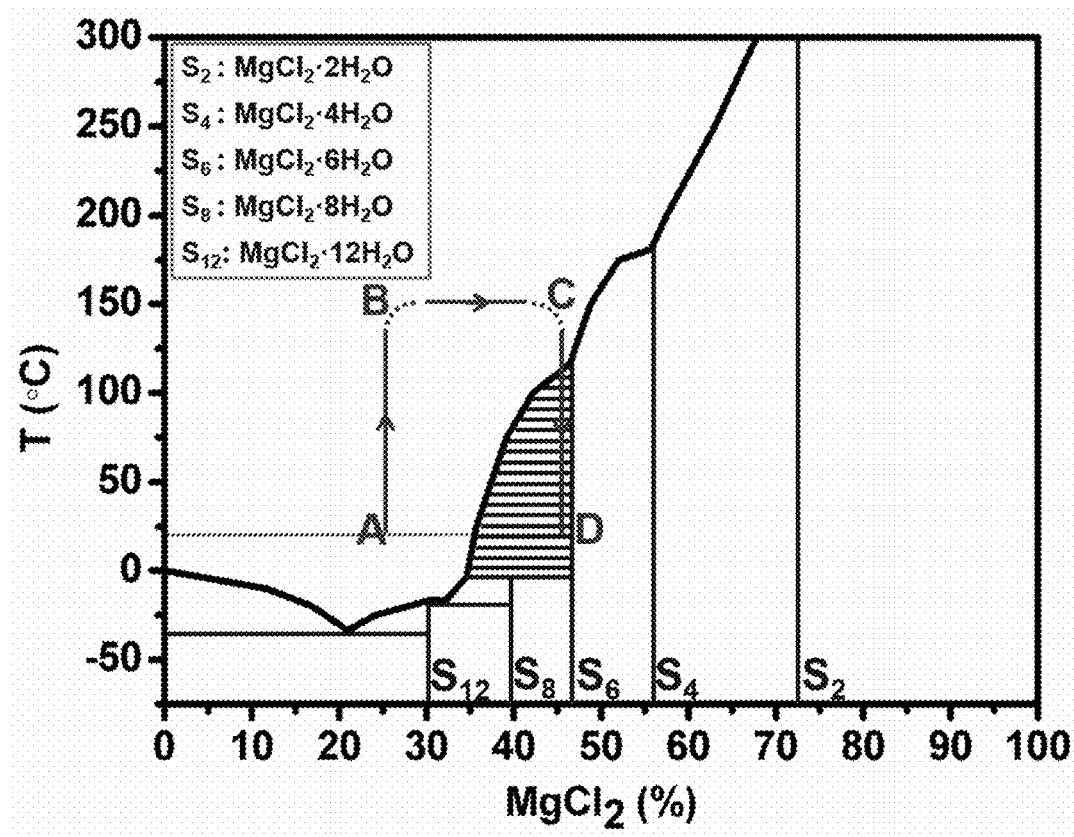
FIG. 1 shows a recrystallization path of the purification of bischofite as shown in the phase diagram in an exemplary embodiment of the present application.

Given the shortcomings of the prior art that the existing recrystallization method does not sufficiently improve the latent heat storage capacity of industrial grade bischofite, the technical schemes of the present invention are proposed based on long-time research and extensive practice, which mainly addresses the shortcomings by providing a method combining differential scanning calorimeter (DSC) and stepping evaporation (or stepping dilution), where the prepared hydrated salts ($MgCl_2 \cdot 6H_2O$), although still containing relatively high levels of salt lake impurities compared to the analytical purity, still has a latent heat storage capacity improved to a level comparable to that of the superior purity.

The technical schemes of the present application will be described clearly and completely below, and it is clear that the described embodiments are a part of the embodiments of the present application, and not all of them. Based on the embodiments in the present application, all other embodiments obtained by a person of ordinary skill in the art without making creative labor fall within the scope of protection of the present application.

An aspect of an embodiment of the present application provides a method for enhancing thermal energy storage performance of industrial grade hydrated salts based on phase change, comprising the steps as follows:

S1: heating an aqueous system of industrial grade hydrated salts containing industrial grade hydrated salt of 105-130 percent (%) of $m_0$ by mass, and taking a sample No. 1 from the system for DSC testing when the mass of the aqueous system of industrial grade hydrated salts is reduced to $m_0$, recording a melting enthalpy of sample No. 1 as $\Delta H_1$ and the mass of the remaining industrial grade hydrated salts aqueous solution as $m_1$; or, heating and melting a recrystallized industrial grade hydrated salts system of mass $m_0$, taking a sample No. 1 for DSC testing and recording the melting enthalpy of sample No. 1 as $\Delta H_1$ and the mass of the remaining industrial grade hydrated salts system as $m_1$; and S2: melting and adding water into, or melting and evaporating the residual aqueous system of industrial grade hydrated salts or the residual industrial grade hydrated salts system with the mass of $m_1$ in step S1 to increase or decrease the mass by 0.4-0.8% of $m_0$, then taking a sample No. 2 from the residual system for DSC testing and recording the melting enthalpy of the sample No. 2 as $\Delta H_2$, and taking the mass of the residual aqueous system of industrial grade hydrated salts or residual industrial grade hydrated salts system as $m_2$; then repeating the melting and adding water or melting and evaporating process until a melting enthalpy $\Delta H_n$ of a sample No. n that taken from the residual aqueous system of industrial grade hydrated salts or residual industrial grade hydrated salts system with a mass of $m_n$ satisfies $\Delta H_2 < \ldots < \Delta H_n > \Delta H_{n+1}$, or the difference between $\Delta H_n$ and $\Delta H_{GR}$ is in a range of −5-5 Joule (J/g), where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, and $\Delta H_{GR}$ being the melting enthalpy of superior purity hydrated salts, n ☐2.

In some rather specific embodiments, the method also includes:

S21: melting and evaporating the residual aqueous system of industrial grade hydrated salts or residual industrial grade hydrated salts system of mass $m_1$ in step S1 until the mass is reduced by 0.4 to 0.8% of $m_0$, taking the sample No. 2 from the residual system for DSC testing and recording the melting enthalpy of the sample No. 2 as $\Delta H_2$, and taking the mass of the residual aqueous system of industrial grade hydrated salts or residual industrial grade hydrated salts system as $m_2$; and S22: when $\Delta H_1 < \Delta H_2$, continuing melting and evaporating the residual industrial grade hydrated salt aqueous solution system or the residual industrial grade hydrated salt system with mass $m_2$ until the mass is reduced by 0.4 to 0.8% of $m_0$, repeating S21 until the melting enthalpy $\Delta H_n$ of the sample No. n that taken from the residual aqueous system of industrial grade hydrated salts or residual industrial grade hydrated salts system with a mass of $m_n$ satisfies $\Delta H_1 < \Delta H_2 < \ldots < \Delta H_n > \Delta H_{n+1}$, or the difference between $\Delta H_n$ and $\Delta H_{GR}$ is in the range of −5-5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n ☐2.

In some rather specific embodiments, the method also includes:

S21: the residual aqueous system of industrial grade hydrated salts or residual industrial grade hydrated salts system of mass $m_1$ in step S1 is subjected to melting and evaporating to reduce the mass by 0.4 to 0.8% of $m_0$, after which a sample No. 2 is taken from the system for DSC testing and the melting enthalpy of this sample No. 2 is recorded as $\Delta H_2$ and the mass of the residual aqueous system of industrial grade hydrated salts or residual industrial grade hydrated salts system is recorded as $m_2$; and S22: when $\Delta H_1 < \Delta H_2$, the residual industrial grade hydrated salts aqueous system or the residual industrial grade hydrated salts system with mass $m_2$ is subjected to melting and diluting with water to increase the mass of the system by 0.4-0.8% of $m_0$, and then melting and diluting with water is repeated until the melting enthalpy $\Delta H_n$ of the sample No. n taken from the residual industrial grade hydrated salts aqueous system or the residual industrial grade hydrated salts system with mass $m_n$ satisfies $\Delta H_2 < \Delta H_3 < \ldots < \Delta H_n > \Delta H_{n+1}$, or the difference between $\Delta H_n$ and $\Delta H_{GR}$ is in the range of −5 to 5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n □3.

In some rather specific embodiments, the method also comprises:

S21: the residual aqueous system of industrial grade hydrated salts or residual industrial grade hydrated salts system of mass $m_1$ in step S1 is subjected to melting and diluting with water to increase the mass by 0.4-0.8% of $m_0$, after which the sample No. 2 is taken for DSC testing and the melting enthalpy of the sample No. 2 is recorded as $\Delta H_2$, the mass of the residual aqueous system of industrial grade hydrated salts or residual industrial grade hydrated salts system is recorded as $m_2$; and S22: when $\Delta H_1 < \Delta H_2$, the residual aqueous system of industrial grade hydrated salts or the residual industrial grade hydrated salts system with mass $m_2$ is subjected to melting and diluting with water to increase the mass of the system by 0.4-0.8% of $m_0$, and then the step S21 is repeated until the melting enthalpy $\Delta H_n$ of the sample No. n that taken from the residual aqueous system of industrial grade hydrated salts or the residual industrial grade hydrated salts system with mass $m_n$ satisfies $\Delta H_1 < \Delta H_2 < \ldots < \Delta H_n > \Delta H_{n+1}$, or the difference between $\Delta H_n$ and $\Delta H_{GR}$ is in the range of −5 to 5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n □2.

In some rather specific embodiments, the method also comprises:

S21: the residual industrial grade hydrated salt aqueous solution system or residual industrial grade hydrated salt system of mass $m_1$ in step S1 is subjected to melting and diluting with to increase the mass by 0.4-0.8% of $m_0$, after which the sample No. 2 is taken for DSC testing and the melting enthalpy of the sample No. 2 is recorded as $\Delta H_2$ and the mass of the residual industrial grade hydrated salt aqueous solution system or residual industrial grade hydrated salt system is recorded as $m_2$; and S22: when $\Delta H_1 > \Delta H_2$, the residual industrial grade hydrated salt aqueous solution system or the residual industrial grade hydrated salt system with mass $m_2$ is subjected to melting and evaporating until the mass of the system is reduced by 0.4-0.8% $m_0$; then the melting and evaporating is repeated until the melting enthalpy $\Delta H_n$ of the sample No. n that taken from the residual industrial grade hydrated salt aqueous solution system or the residual industrial grade hydrated salt system with mass $m_n$ satisfies $\Delta H_2 < \Delta H_3 < \ldots < \Delta H_n > \Delta H_{n+1}$, or the difference between $\Delta H_n$ and $\Delta H_{GR}$ is in the range of −5 to 5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n □3.

In some rather specific embodiments, the heating or heating and melting in step S1 is carried out at temperatures in a range of 95 to 125 degree Celsius (° C.).

In some rather specific embodiments, the industrial grade hydrated salts include any one selected from a group of, and is not limited to, bischofite, sodium acetate trihydrate, calcium chloride hexahydrate, magnesium nitrate hexahydrate.

Optionally, the industrial grade hydrated salt is bischofite.

In some rather specific embodiments, the mass $m_0$ is in a range of 10 gram (g)≤$m_0$≤100 kilogram (kg).

In some rather specific embodiments, the mass of any of the sample from sample No. 1 to sample No. n+1 is in a range of 0.1 g to 0.3 g.

In some rather specific embodiments, the method further comprises: dissolving an industrial bischofite of a mass of 105-130% $m_0$ in water, and then filtering the water dissolved with industrial bischofite to form the aqueous system of industrial grade hydrated salts.

In some rather specific embodiments, the method further includes: heating the aqueous system of industrial grade hydrated salts to above 95° C. and evaporating the aqueous system of industrial grade hydrated salts with constant stirring to reduce its mass to $m_0$.

Figure 6:
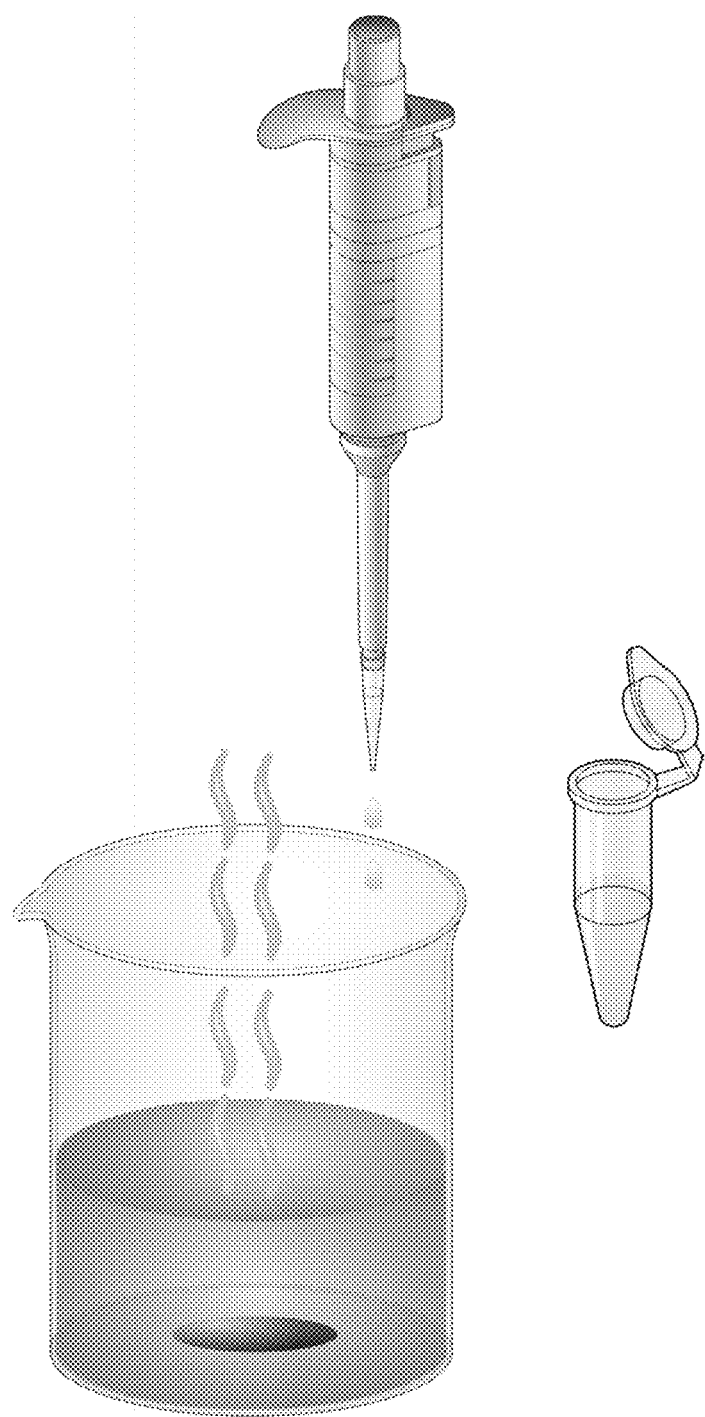
FIG. 6 shows a schematic diagram of an exemplary embodiment of the present application in which the water content is precisely regulated by stepping evaporation or stepping dilution.

In some rather specific embodiments, the method for enhancing thermal energy storage performance of industrial grade hydrated salts based on phase change also includes the steps as follows:

(1) dissolving an industrial grade bischofite with a mass of 105-130% of $m_0$ (e.g.: $m_0$=1,000 g) in water, filtering the water dissolved with bischofite to remove insoluble impurities to obtain an aqueous solution of magnesium chloride; or taking $MgCl_2 \cdot 6H_2O$, obtained by recrystallization of industrial bischofite under conventional methods, with the mass of $m_0$ (e.g.: $m_0$=1,000 g);

(2) heating the aqueous solution to above 95° C. while magnetically stirring for evaporation, while making sure that the temperature raises along with the continuous increasing of concentration of the system (95-125° C.), and making sure that the system remains a liquid state; constantly monitoring the mass change of the system during the evaporation experiment;

(3) taking a sample (noted as sample No. 1) (0.1-0.3 g) for DSC testing when the system mass is regulated (decreasing by evaporating or increasing by diluting as shown in FIG. 6) to near $m_0$, and recording the mass of the solution system after sampling as $m_1$;

(4) evaporating the system, and taking a sample (recorded as sample No. 2) (0.1-0.3 g) for DSC testing when the mass is reduced by 0.5% of $m_0$ (e.g., 5 g), and recording the mass of the solution system after sampling as $m_2$;

(5) determining whether the current system needs to be evaporated (water content of current system is high) or diluted (water content of current system is low) in the direction of the best point: comparing the melting enthalpies $\Delta H_1$, $\Delta H_2$ of the DSC test results of samples No. 1 and No. 2, and continue evaporating and repeating step (4) when $\Delta H_1 < \Delta H_2$ until $\Delta H_1 < \Delta H_2 < \ldots < \Delta H_n \approx \Delta H_{GR}$ ($\Delta H_{GR}$ is the melting enthalpy of superior purity hydrated salt), or until $\Delta H_1 < \Delta H_2 < \ldots < \Delta H_n > \Delta H_{n+1}$, then marking the system corresponding to the mass of $m_n$ after taking out the DSC sample No. n as the optimized system, and regulating the current system $m_{n+1}$ back to $m_0$; diluting the system by adding water of 0.5% $m_0$ each time when $\Delta H_1 > \Delta H_2$ until $\Delta H_2 < \Delta H_3 < \ldots < \Delta H_n \approx \Delta H_{GR}$, or until $\Delta H_2 < \Delta H_3 < \ldots < \Delta H_n > \Delta H_{n+1}$, then marking the system corresponding to $m_n$ after taking sample No. n as the optimized system, and regulating the current system $m_{n+1}$ back to $m_n$;

(6) except starting by evaporating, the above step (4) can also be started from diluting, then the steps (4) and (5) are: (4) diluting the system and taking a sample (recorded as sample No. 2) (0.1-0.3 g) for DSC testing when the mass is increased by 0.5% $m_0$ (e.g., 5 g), and recording the mass of the solution system after sampling as $m_2$; (5) determining whether the current system needs to be evaporated (water content of current system is high) or diluted (water content of current system is low) in the direction of the best point: comparing the melting enthalpies $\Delta H_1$, $\Delta H_2$ of the DSC test results of samples No. 1 and No. 2, and continue diluting and repeating step (4) when $\Delta H_1 < \Delta H_2$ until $\Delta H_1 < \Delta H_2 < \ldots < \Delta H_n \approx \Delta H_{GR}$, or until $\Delta H_1 < \Delta H_2 < \ldots < \Delta H_n > \Delta H_{n+1}$, then marking the system corresponding to the mass of $m_n$ after taking out the DSC sample No. n as the optimized system, and regulating the current system $m_{n+1}$ back to $m_n$; evaporating the system by 0.5% $m_0$ (e.g., 5 g) each time when $\Delta H_1 > \Delta H_2$ until $\Delta H_2 < \Delta H_3 < \ldots < \Delta H_n$ $\Delta H_{GR}$, or until $\Delta H_2 < \Delta H_3 < \ldots < \Delta H_n > \Delta H_{n+1}$, then marking the system corresponding to $m_n$ after taking sample No. n as the optimized system, and regulating the current system $m_{n+1}$ back to $m_n$; and (7) placing the optimized system materials obtained from (7) in a closed container and cooling to a room temperature to obtain $MgCl_2 \cdot 6H_2O$ with latent heat storage capacity comparable to that of the superior purity.

The technical scheme of the present application is described in further detail below in conjunction with several preferred embodiments and the accompanying drawings. The present embodiments are implemented under the premise of the technical scheme of the application, and detailed implementation and specific operating procedures are given, but the scope of protection of the present application is not limited to the following embodiments.

The experimental materials adopted in the embodiments described below could be purchased from conventional biochemical reagent companies if not otherwise specified.

Figure 2:
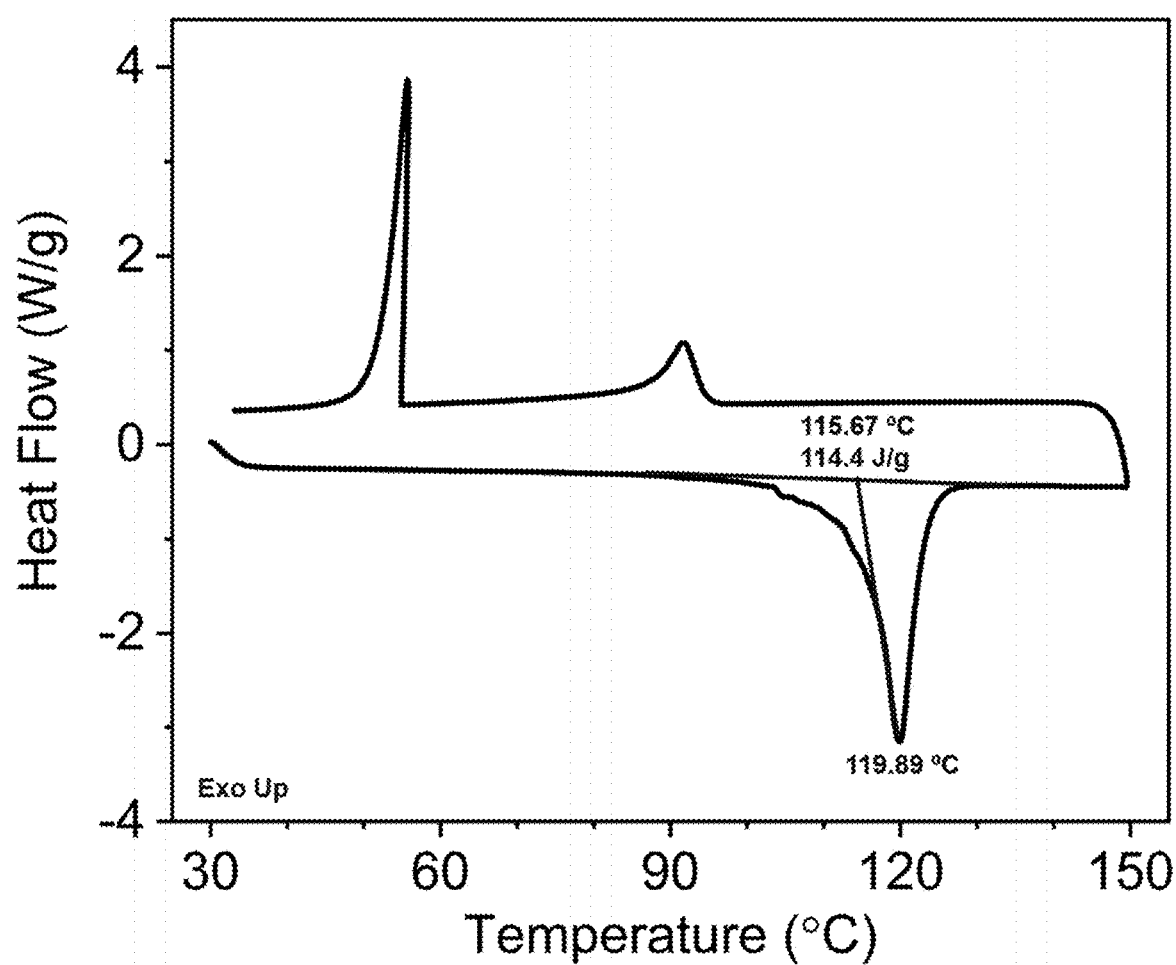
FIG. 2 shows a differential scanning calorimeter (DSC) graph of Qaidam Salt Lake industrial bischofite in an exemplary embodiment of the present application.
Figure 3:
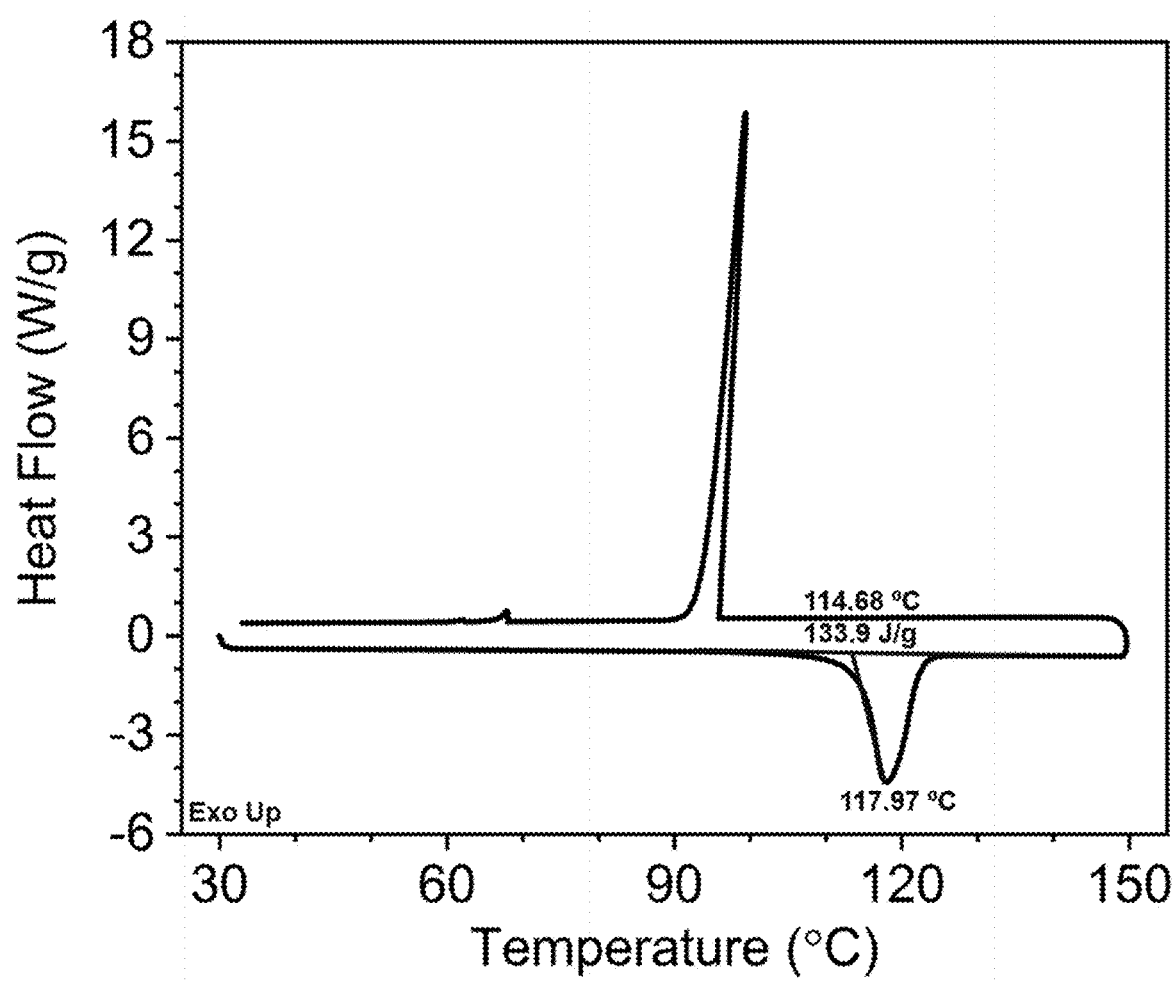
FIG. 3 shows a DSC graph of $MgCl_2 \cdot 6H_2O$ prepared from Qaidam Salt Lake industrial bischofite by conventional recrystallization in an exemplary embodiment of the present application.
Figure 4:
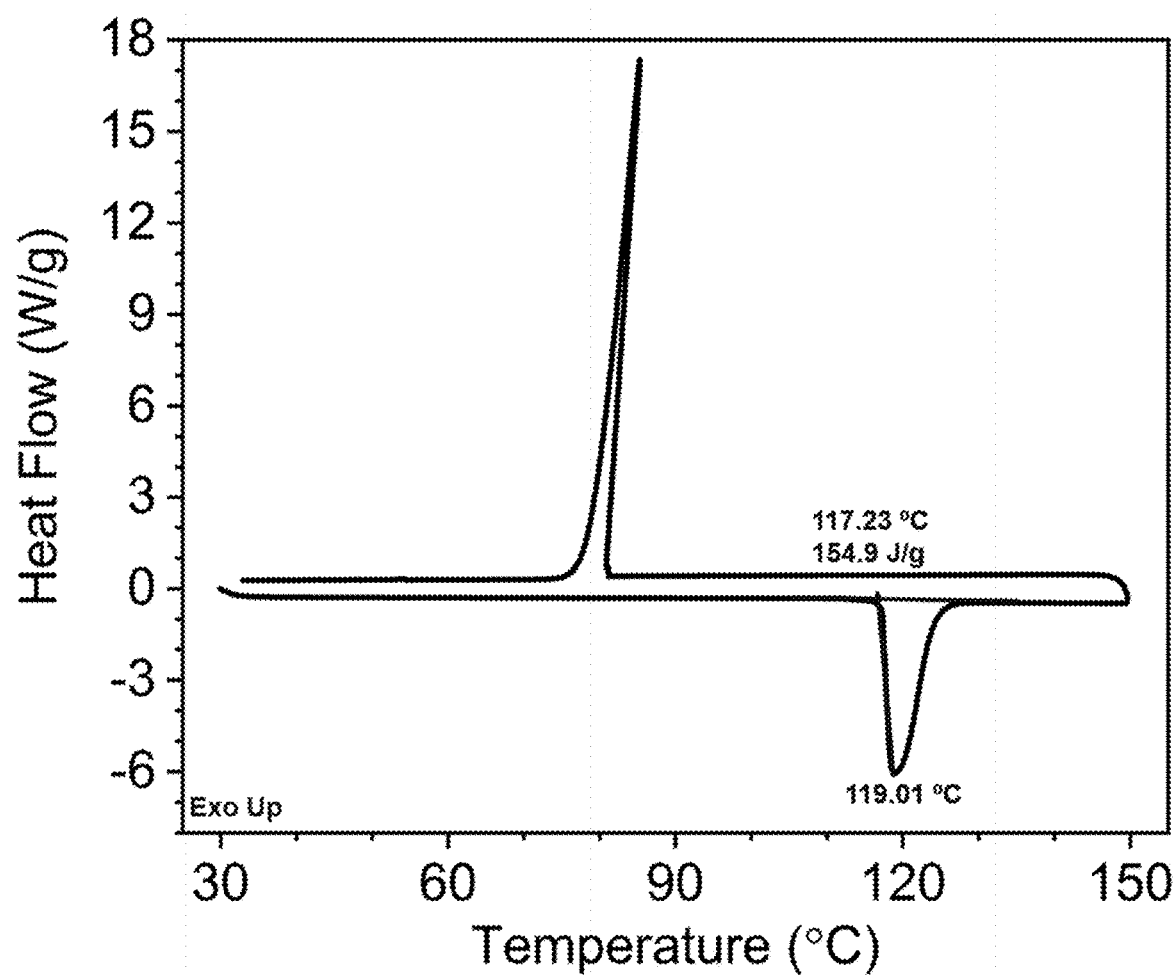
FIG. 4 shows a DSC graph of analytical purity $MgCl_2 \cdot 6H_2O$ in an exemplary embodiment of the present application.
Figure 5:
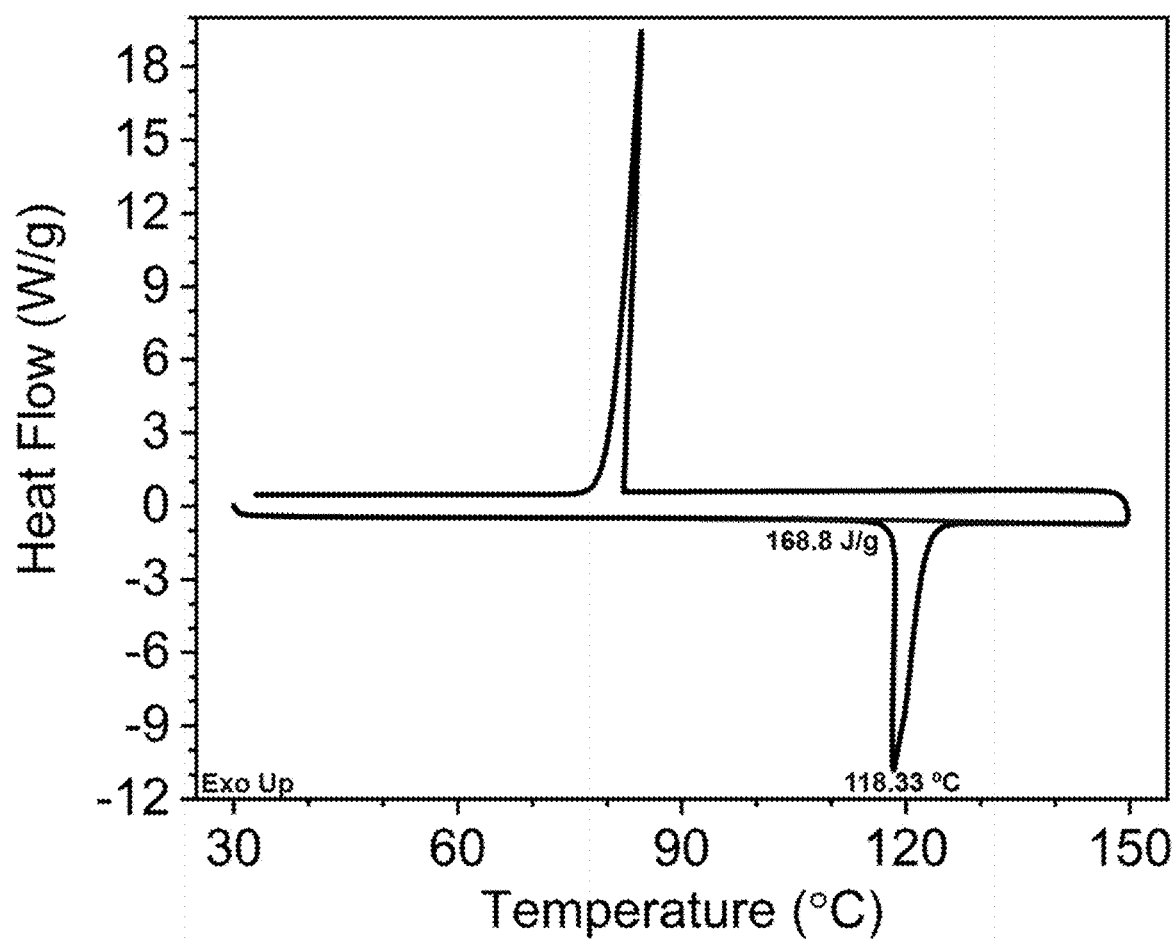
FIG. 5 shows a DSC graph of superior purity $MgCl_2 \cdot 6H_2O$ in an exemplary embodiment of the present application.
Figure 7:
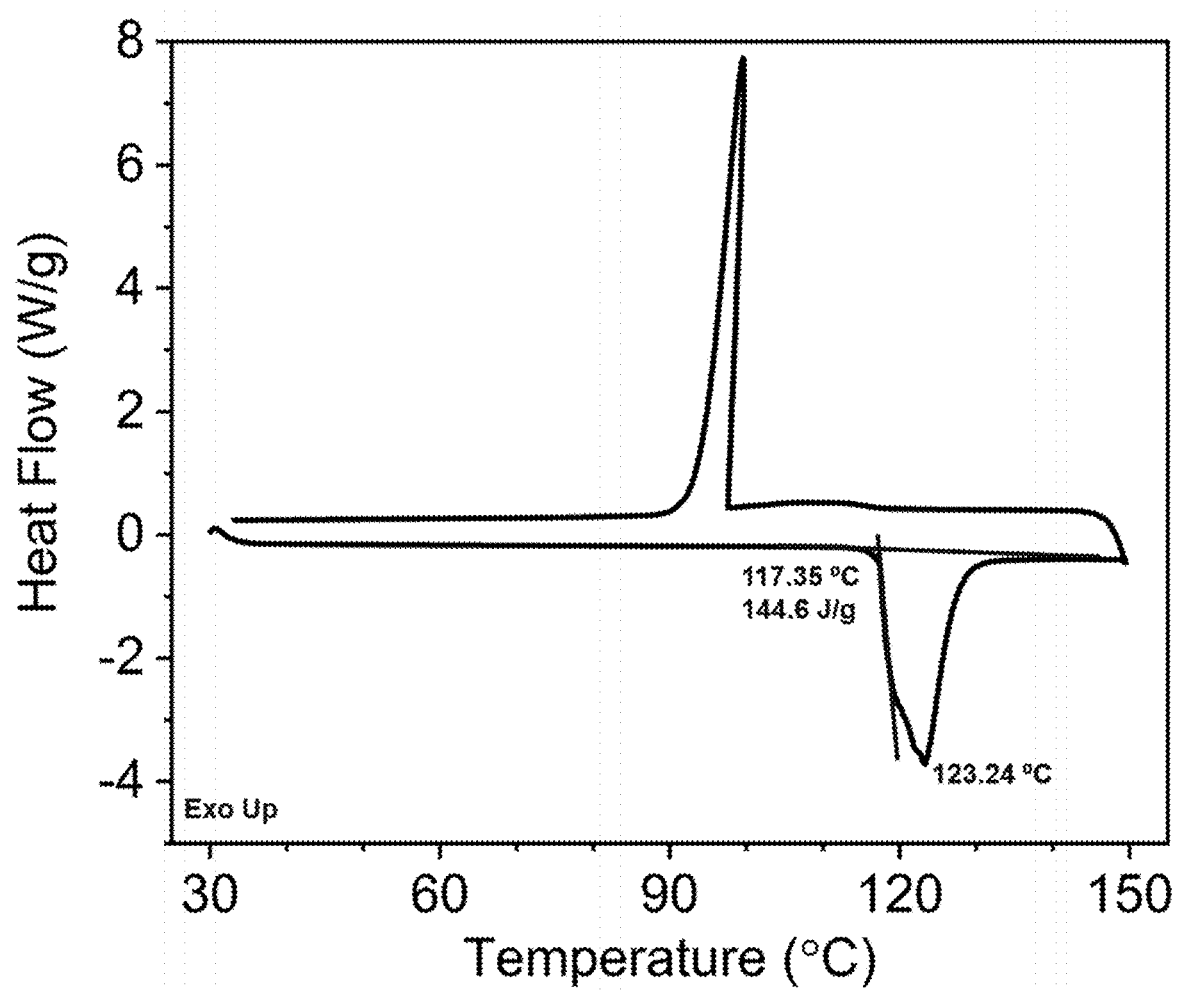
FIG. 7 shows a DSC graph of Qaidam Salt Lake industrial bischofite from being dissolved in water, suction and filtration, to being evaporated to a dehydrated state ($MgCl_2 \cdot xH_2O$, x<6) in an exemplary embodiment of the present application.
Figure 8:
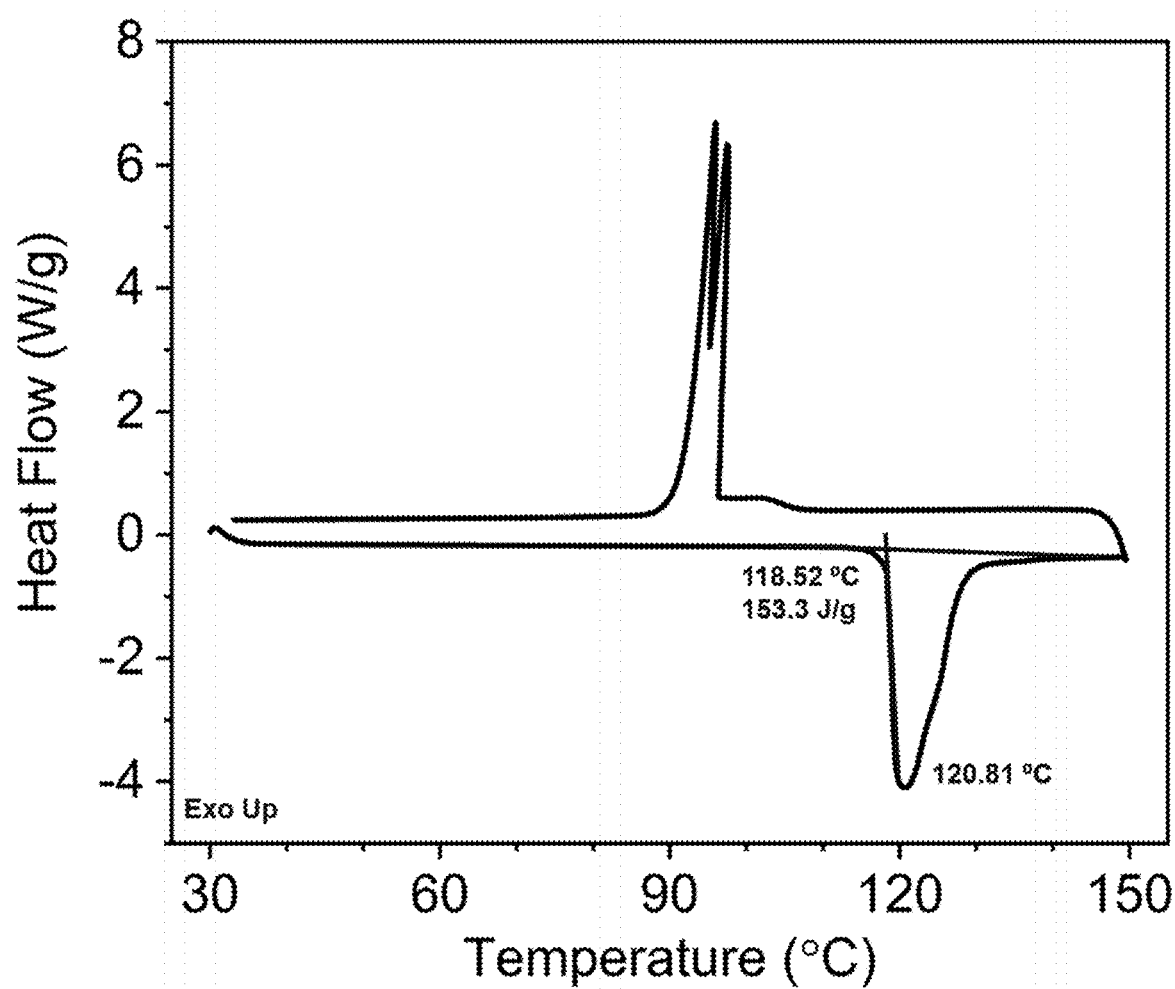
FIG. 8 shows a DSC graph of an exemplary embodiment of the present application after continued dilution with water on the basis of FIG. 7.
Figure 9:
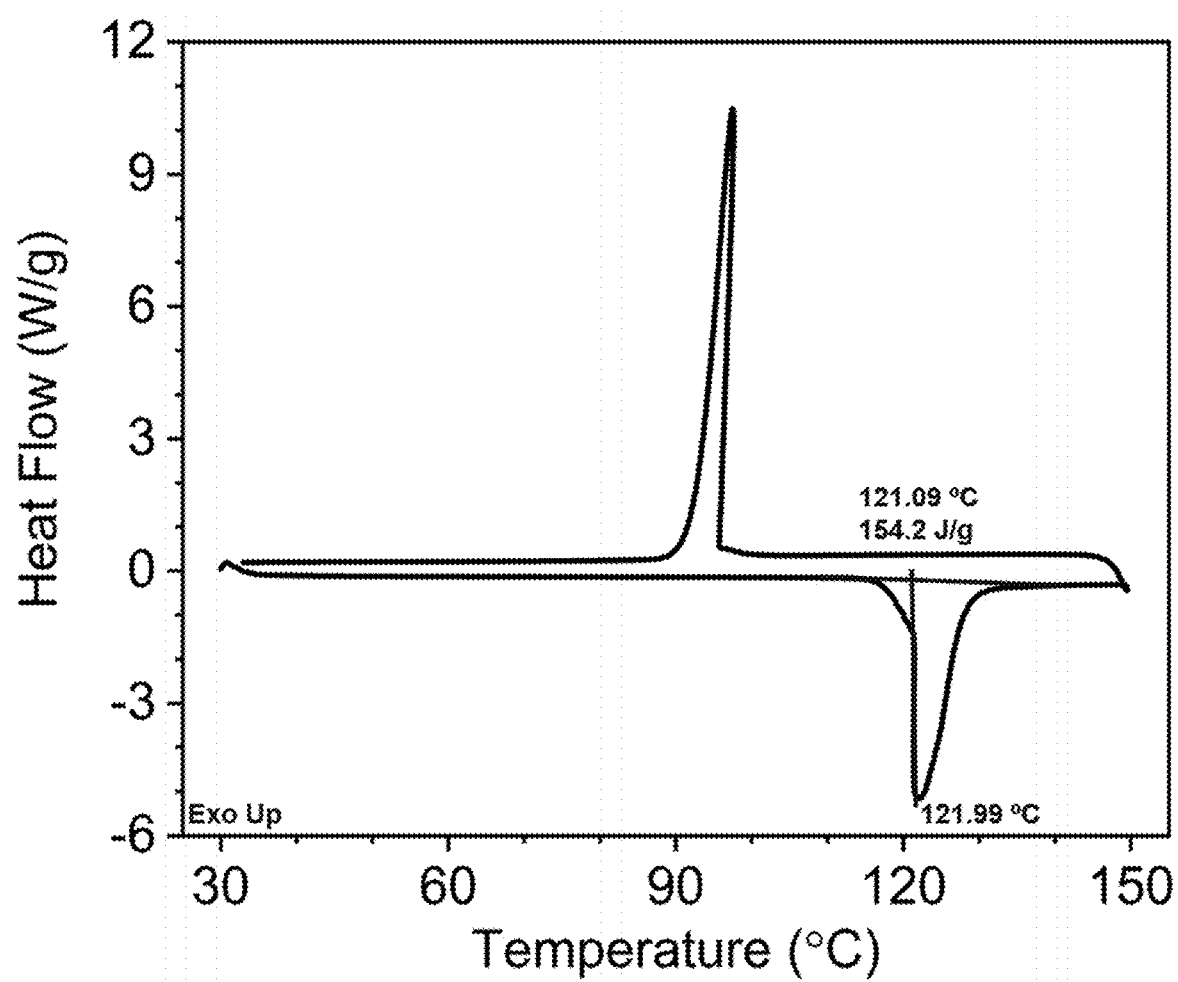
FIG. 9 shows a DSC graph in an exemplary embodiment of the present application after continued dilution with water on the basis of FIG. 8.
Figure 10:
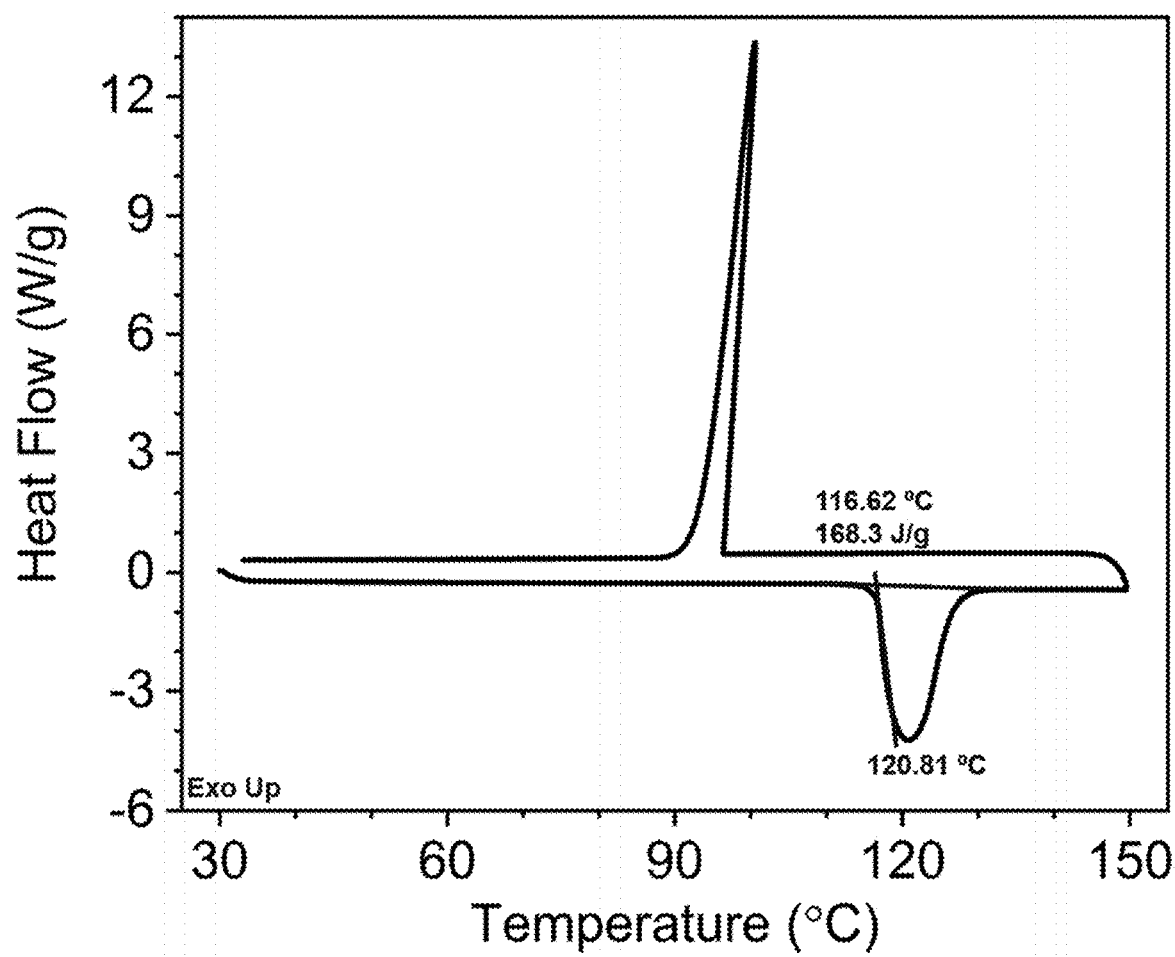
FIG. 10 shows a DSC graph in an exemplary embodiment of the present application after continued dilution with water on the basis of FIG. 9.

Embodiment 1 DSC testing and stepping dilution method to precisely regulate water content to enhance the density of latent heat storage of industrial bischofite of Qaidam Salt Lake (1) Taking a sample of $MgCl_2 \cdot 6H_2O$ obtained by industrial bischofite recrystallization (Shown in FIG. 2) under conventional methods with a mass about 75 g, heating the sample to 125° C. until the system is melted while magnetically stirring the sample for evaporation, and continuously monitoring the mass change of the system during the evaporation experiment;

(2) diluting the system with water (to supplement the evaporation of water from the melting and stirring process) to 72.95 g, taking a sample (noted as sample No. 1) (0.1 to 0.3 g) for DSC testing (FIG. 7), $\Delta H_1 = 144.6$ J/g, and recording the mass of the solution system after sampling as $m_1 = 72.57$ g;

(3) diluting the system with water (about 0.5 g) to 73.05 g, taking a sample (recorded as sample No. 2) for DSC testing (FIG. 8), $\Delta H_2 = 153.3$ J/g, and recording the mass of the solution system after sampling as $m_2 = 72.68$ g;

(4) if $\Delta H_1 < \Delta H_2$, continuing the diluting and repeating step (3) until $m_3 = 72.72$ g, $\Delta H_3 = 154.2$ J/g (FIG. 9), $m_4 = 72.51$ g, $\Delta H_4 = 168.3$ J/g (FIG. 10), $\Delta H_5 = 156.9$ J/g, at this time, the system that satisfies $\Delta H_1 < \Delta H_2 < \Delta H_3 < \Delta H_4 > \Delta H_5$ and $\Delta H_4 = 168.3$ J/g $\approx \Delta H_{GR} = 168.8$ J/g (FIG. 5 and FIG. 10) is the optimized system; and (5) the obtained $MgCl_2 \cdot 6H_2O$, despite still containing more impurities compared to the analytical purity (Table 1), has a latent heat storage capacity improved to a level comparable to that of the superior purity.

TABLE 1

Impurity content in $MgCl_2 \cdot 6H_2O$ obtained in Embodiment 1

| | Content (wt %) | |
| --- | --- | --- |
| Element | Recrystallization | Analytical purity |
| Li | $1.41 \times 10^{-4}$ | $1.26 \times 10^{-4}$ |
| Na | 0.16 | $1.24 \times 10^{-3}$ |
| K | $6.58 \times 10^{-3}$ | $6.79 \times 10^{-4}$ |
| Ca | $5.26 \times 10^{-3}$ | $1.01 \times 10^{-3}$ |
| Ba | $9.96 \times 10^{-6}$ | $4.45 \times 10^{-5}$ |
| Fe | $1.93 \times 10^{-5}$ | $3.98 \times 10^{-6}$ |
| Sr | $8.18 \times 10^{-3}$ | $2.06 \times 10^{-5}$ |

Figure 11:
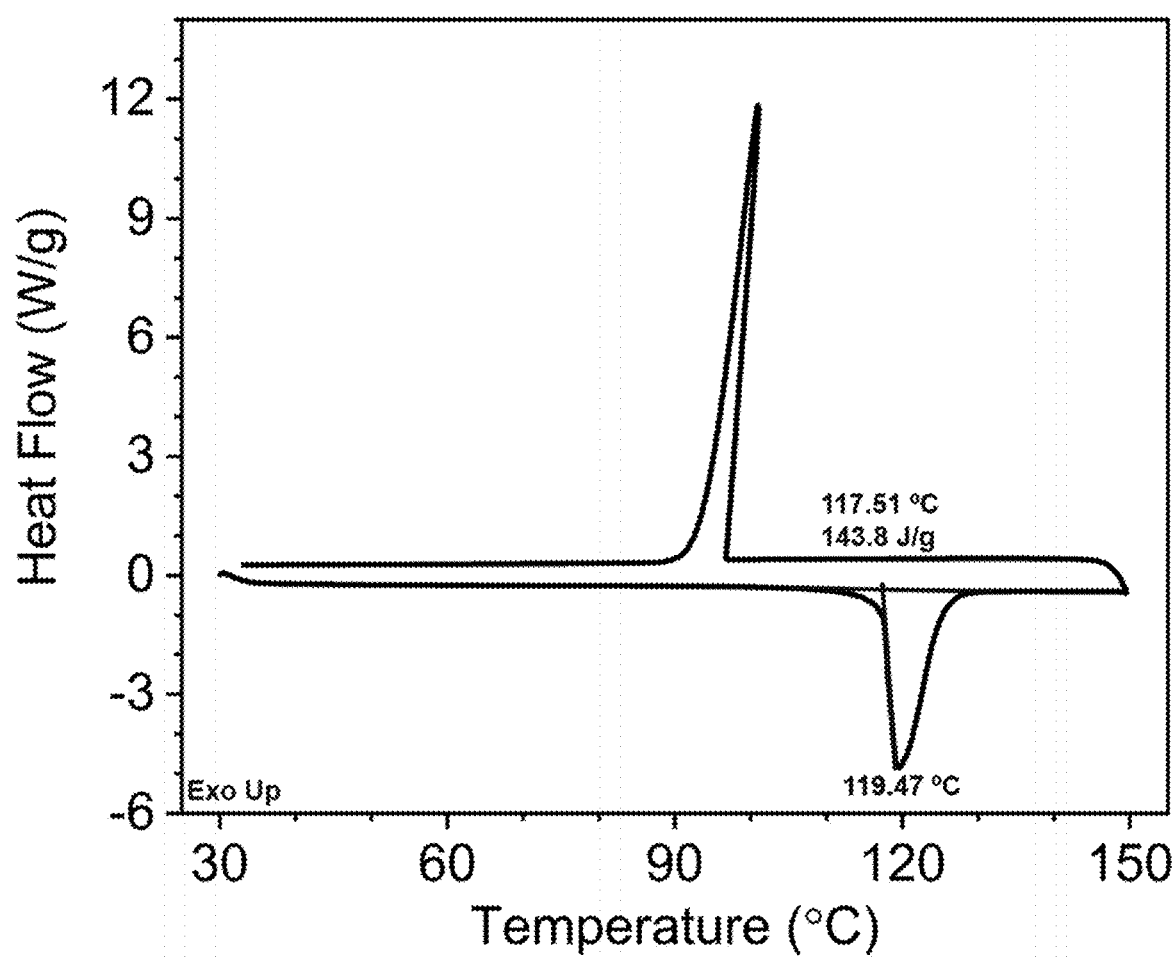
FIG. 11 shows a DSC graph of the Qaidam Salt Lake industrial bischofite after dissolution in water, suction and filtration, and concentration by evaporation in an exemplary embodiment of the present application.
Figure 12:
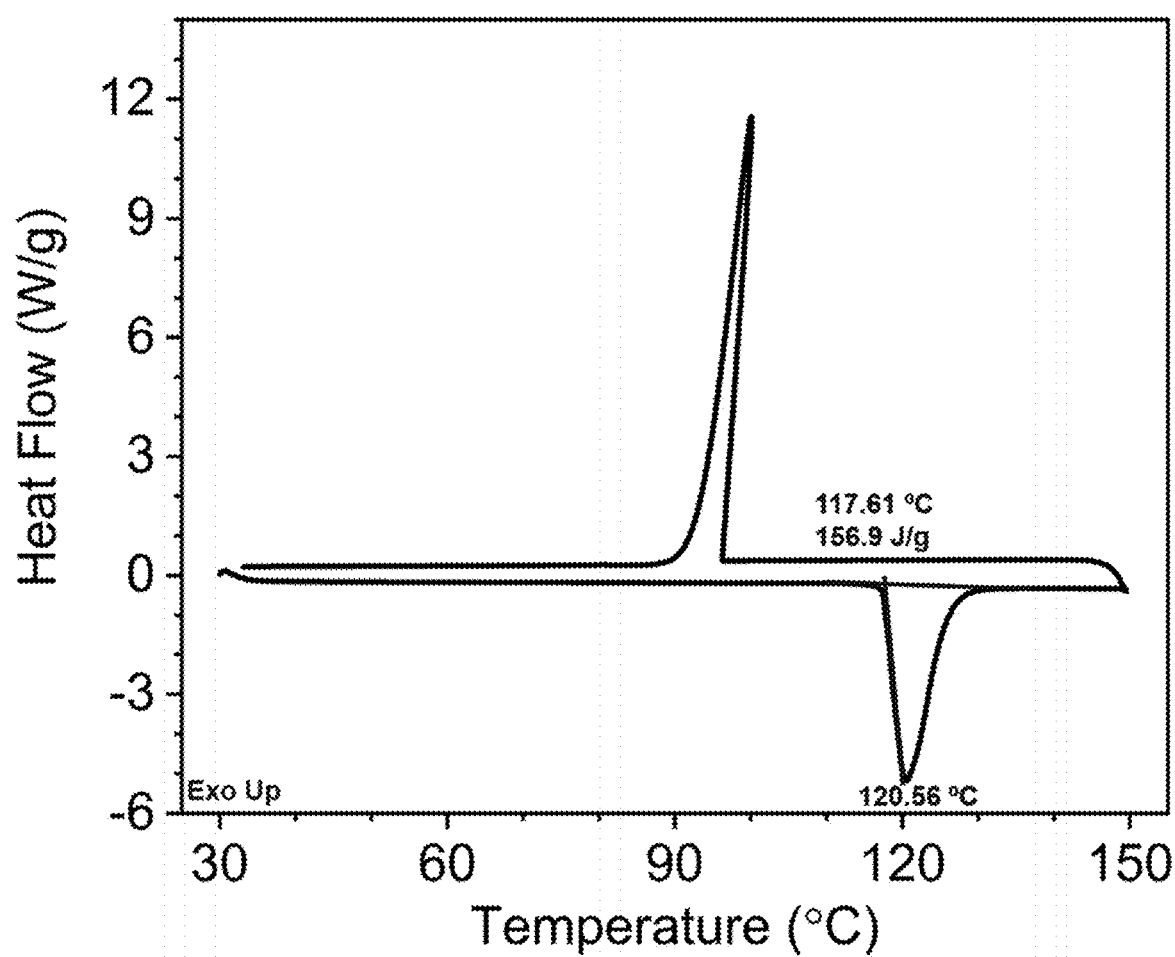
FIG. 12 shows a DSC graph in an exemplary embodiment of the present application after continued concentration by evaporation on the basis of FIG. 11.
Figure 13:
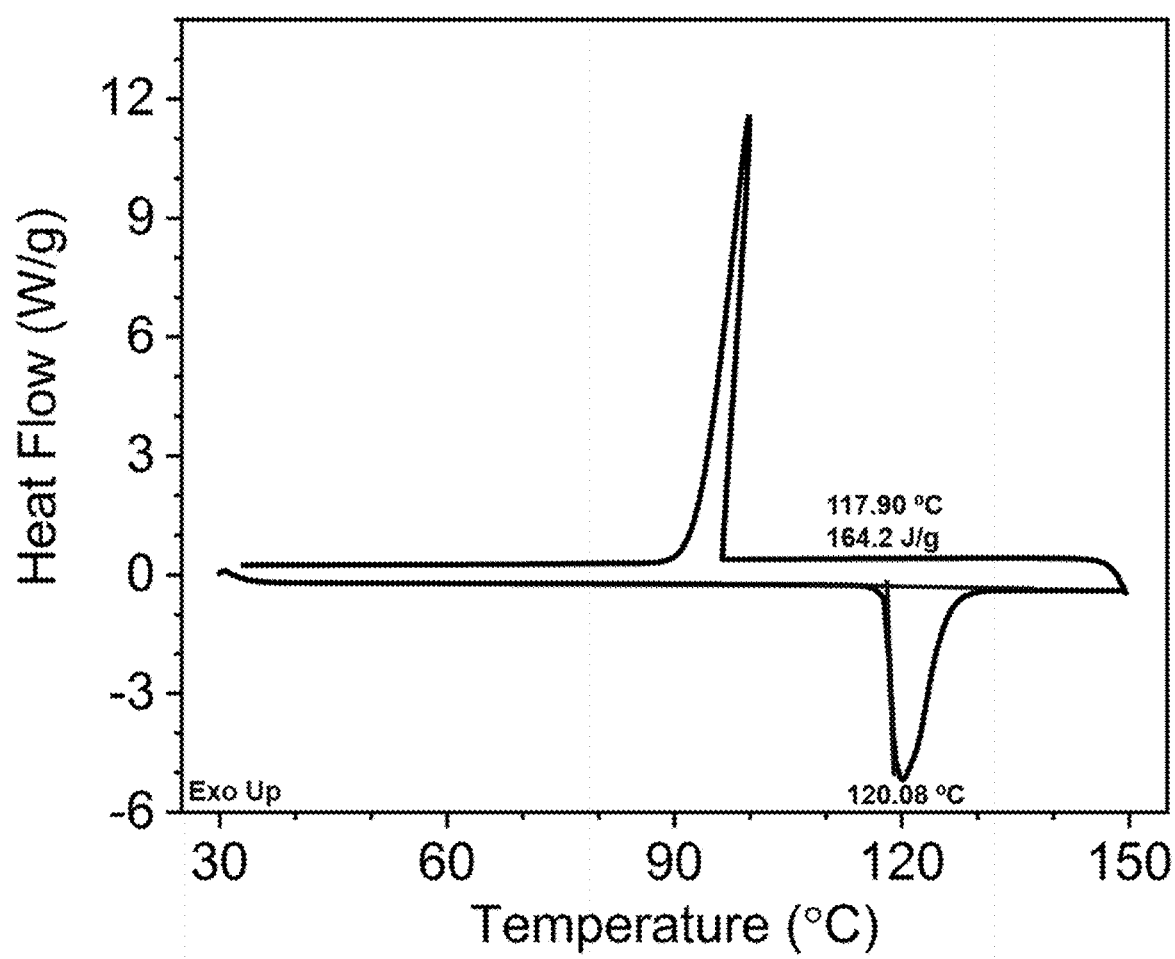
FIG. 13 shows a DSC graph of an exemplary embodiment of the present application after continued concentration by evaporation on the basis of FIG. 12.

Embodiment 2 DSC and stepping evaporation method to precisely regulate the water content to enhance the density of latent heat storage of industrial bischofite of Qaidam Salt Lake (1) Dissolving 120 g of industrial bischofite in water and filtering the water dissolved with industrial bischofite to remove insoluble impurities to obtain an aqueous solution of magnesium chloride;

(2) heating the aqueous solution to above 95° C. while magnetically stirring for evaporation, making sure that the temperature rises along with the continuous increasing of concentration of the system (95-125° C.) and making sure that the system remains a liquid state; and constantly monitoring the quality change of the system during the evaporation experiment;

(3) taking a sample (noted as sample No. 1) (0.1-0.3 g) for DSC testing (FIG. 11) when the mass of the system is reduced to 98 g by evaporation, $\Delta H_1 = 143.8$ J/g, and recording the mass of the solution system $m_1 = 97.52$ g after sampling;

(4) continuing evaporating the system to 97.02 g, taking a sample (recorded as sample No. 2) (0.1-0.3 g) for DSC testing (FIG. 12), $\Delta H_2 = 156.9$ J/g, and recording the mass of the solution system after sampling as $m_2 = 96.68$ g; and (5) if $\Delta H_1 < \Delta H_2$, continuing evaporating and repeating step (4) until $m_3 = 95.72$ g, $\Delta H_3 = 164.2$ J/g (FIG. 13), at this time, the system that satisfies $\Delta H_3 = 164.2$ J/g $\approx \Delta H_{GR} = 168.8$ J/g (FIG. 5 and FIG. 13) is the optimized system, whose latent heat storage capacity is comparable to that of the superior purity $MgCl_2 \cdot 6H_2O$.

Embodiment 3 DSC testing and stepping dilution method to precisely regulate the water content to enhance the density of latent heat storage of industrial bischofite of Qaidam Salt Lake (1) Taking a sample of $MgCl_2 \cdot 6H_2O$ obtained by industrial bischofite recrystallization under conventional methods with a mass about 75 g, heating the sample to 125° C. until the system is melted while magnetically stirring the sample for evaporation, and continuously monitoring the mass change of the system during the evaporation experiment;

(2) diluting the system with water (to supplement the evaporation of water from the melting and stirring process) to 74.95 g, taking a sample (noted as sample No. 1) (0.1 to 0.3 g) for DSC testing, $\Delta H_1 = 145.6$ J/g, and recording the mass of the solution system after sampling as $m_1 = 74.57$ g;

(3) diluting the system with water (about 0.5 g) to 75.05 g, taking a sample (recorded as sample No. 2) for DSC testing, $\Delta H_2=136.8$ J/g, and recording the mass of the solution system after sampling as $m_2=74.68$ g;

(4) if $\Delta H_1 < >\Delta H_2$, evaporating the system with 0.5% of $m_0$ (e.g., 5 g) of water mass for each evaporation to obtain $m_3=73.05$ g, $\Delta H_3=145.2$ J/g, $m_4=72.01$ g, $\Delta H_4=154.2$ J/g, $m_5=71.15$ g, $\Delta H_5=165.2$ J/g, $m_6=70.15$ g, $\Delta H_6=143.8$ J/g, at this time, the system that satisfies $\Delta H_2<\Delta H_3<\Delta H_4<\Delta H_5>\Delta H_6$, and $\Delta H_5=165.2$ J/g$\approx\Delta H_{GR}=168.8$ J/g is the optimized system; and (5) the obtained $MgCl_2\cdot 6H_2O$, despite still containing more impurities compared to the analytical purity, has a latent heat storage capacity improved to a level comparable to that of the superior purity Embodiment 4 DSC testing and stepping dilution method to precisely regulate the water content to enhance the density of latent heat storage of industrial bischofite of Qaidam Salt Lake (1) Dissolving 120 g of industrial bischofite in water and filtering the water dissolved with industrial bischofite to remove insoluble impurities to obtain an aqueous solution of magnesium chloride;

(2) heating the aqueous solution to above 95° C. while magnetically stirring for evaporation, making sure that the temperature rises along with the continuous increasing of concentration of the system (95-125° C.) and making sure that the system remains a liquid state; and constantly monitoring the quality change of the system during the evaporation experiment;

(3) taking a sample (noted as sample No. 1) (0.1-0.3 g) for DSC testing when the mass of the system is reduced to 95 g by evaporation, $\Delta H_1=145.8$ J/g, and recording the mass of the solution system as $m_1=94.52$ g after sampling;

(4) evaporating the system to 94.02 g, and taking a sample (recorded as sample No. 2) (0.1-0.3 g) for DSC testing, $\Delta H_2=130.9$ J/g, and recording the mass of the solution system after sampling as $m_2=93.68$ g; and (5) Because $\Delta H_1>\Delta H_2$, diluting the system by adding water with mass of 0.5% $m_0$ (e.g., 5 g) at each time until $m_3=94.10$ g, $\Delta H_3=145.2$ J/g, $m_4=94.25$ g, $\Delta H_4=155.2$ J/g, $m_5=94.35$ g, $\Delta H_5=166.2$ J/g, $m_6=95.55$ g, $\Delta H_6=145.8$ J/g, at which point the system that satisfies $\Delta H_2<\Delta H_3<\Delta H_4<\Delta H_5>\Delta H_6$, and $\Delta H_5=166.2$ J/g$\approx\Delta H_{GR}=168.8$ J/g is the optimized system, and its latent heat storage capacity is comparable to that of the superior purity $MgCl_2\cdot 6H_2O$.

Additionally, other experiments with other raw materials, process operations and process conditions described in this specification have been carried out by the inventors of this case with reference to the aforementioned embodiments and have yielded relatively satisfactory results.

It should be understood that the technical schemes of the present application are not limited to the limits of the above specific embodiments, and any technical variations made according to the technical solutions of the present application, without departing from the scope protected by the purpose and claims of the present application, fall within the scope of protection of the present application.

What is claimed is:

1. A method for enhancing thermal energy storage performance of industrial grade hydrated salts based on phase change, comprising following steps, where a symbol "$m_0$" represents the mass of the aqueous system of industrial grade hydrated salts after being heated, and the numerical value of m0 is in a range of 10 gram (g)$\leq m_0 \leq$100 kilogram (kg):

S1: heating an aqueous system of industrial grade hydrated salts containing industrial grade hydrated salt of 105-130% of $m_0$ by mass, and taking a sample No. 1 from the system for differential scanning calorimeter (DSC) testing when the mass of the aqueous system of industrial grade hydrated salts is reduced to $m_0$, recording a melting enthalpy of sample No. 1 as $\Delta H_1$ and the mass of the remaining industrial grade hydrated salts aqueous solution as $m_1$; or, heating and melting a recrystallized industrial grade hydrated salts system of mass $m_0$, taking a sample No. 1 for DSC testing and recording the melting enthalpy of sample No. 1 as $\Delta H_1$ and the mass of the remaining industrial grade hydrated salts system as $m_1$; and S2: melting and adding water into, or melting and evaporating the residual aqueous system of industrial grade hydrated salts or the residual industrial grade hydrated salts system with the mass of $m_1$ in step S1 to increase or decrease the mass by 0.4-0.8% $m_0$, then taking a sample No. 2 from the residual system for DSC testing and recording the melting enthalpy of the sample No. 2 as $\Delta H_2$, and taking the mass of the residual aqueous system of industrial grade hydrated salts or residual industrial grade hydrated salts system as $m_2$; then repeating the melting and adding water or melting and evaporating process until a melting enthalpy $\Delta H_n$ of a sample No. n that taken from the residual aqueous system of industrial grade hydrated salts or residual industrial grade hydrated salts system with a mass of $m_n$ satisfies $\Delta H_2 < \ldots < \Delta H_n > \Delta H_{n+1}$, or the difference between $\Delta H_n$ and $\Delta H_{GR}$ is in a range of −5-5 Joule (J/g), where the residual aqueous system of industrial grade hydrated salts or the residual industrial grade hydrated salts system with the mass of $m_n$ is confirmed to be a desired industrial hydrated salts system with improved phase change thermal energy storage performance, with $\Delta H_n$ being the melting enthalpy of sample No. n+1, and $\Delta H_{GR}$ being the melting enthalpy of superior purity hydrated salts, n≥2.

2. The method according to claim 1, wherein the method comprises:

S21: melting and evaporating the residual aqueous system of industrial grade hydrated salts or residual industrial grade hydrated salts system of mass $m_1$ in step S1 until the mass is reduced by 0.4 to 0.8% of $m_0$, taking the sample No. 2 from the residual system for DSC testing and recording the melting enthalpy of the sample No. 2 as $\Delta H_2$, and taking the mass of the residual aqueous system of industrial grade hydrated salts or residual industrial grade hydrated salts system as $m_2$; and S22: when $\Delta H_1 < \Delta H_2$, continuing melting and evaporating the residual industrial grade hydrated salt aqueous solution system or the residual industrial grade hydrated salt system with mass $m_2$ until the mass is reduced by 0.4 to 0.8% of $m_0$, repeating S21 until the melting enthalpy $\Delta H_n$ of the sample No. n that taken from the residual aqueous system of industrial grade hydrated salts or residual industrial grade hydrated salts system with a mass of $m_n$ satisfies $\Delta H_1 < \Delta H_2 < \ldots < \Delta H_n > \Delta H_{n+1}$, or the difference between $\Delta H_n$ and $\Delta H_{GR}$ is in the range of −5-5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n≥2.

3. The method according to claim 1, wherein the method comprises:

S21: the residual aqueous system of industrial grade hydrated salts or residual industrial grade hydrated salts system of mass $m_1$ in step S1 is subjected to melting and evaporating to reduce the mass by 0.4 to 0.8% of $m_0$, after which a sample No. 2 is taken from the system for DSC testing, the melting enthalpy of this sample No. 2 is recorded as $\Delta H_2$ and the mass of the residual aqueous system of industrial grade hydrated salts or residual industrial grade hydrated salts system is recorded as $m_2$; and S22: when $\Delta H_1 > \Delta H_2$, the residual industrial grade hydrated salts aqueous system or the residual industrial grade hydrated salts system with mass $m_2$ is subjected to melting and diluting with water to increase the mass of the system by 0.4-0.8% of $m_0$, and then melting and diluting with water is repeated until the melting enthalpy $\Delta H_n$ of the sample No. n that taken from the residual industrial grade hydrated salts aqueous system or the residual industrial grade hydrated salts system with mass $m_n$ satisfies $\Delta H_2 < \Delta H_3 < \ldots < \Delta H > \Delta H_{n+1}$, or the difference between $\Delta H_n$ and $\Delta H_{GR}$ is in the range of −5 to 5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n≥3.

4. The method according to claim 1, wherein the method comprises:

S21: the residual aqueous system of industrial grade hydrated salts or residual industrial grade hydrated salts system of mass $m_1$ in step S1 is subjected to melting and diluting with water to increase the mass by 0.4-0.8% of $m_0$, after which the sample No. 2 is taken for DSC testing and the melting enthalpy of the sample No. 2 is recorded as $\Delta H_2$ and the mass of the residual aqueous system of industrial grade hydrated salts or residual industrial grade hydrated salts system is recorded as $m_2$; and S22: when $\Delta H_1 < \Delta H_2$, the residual aqueous system of industrial grade hydrated salts or the residual industrial grade hydrated salts system with mass $m_2$ is subjected to melting and diluting with water to increase the mass of the system by 0.4-0.8% of $m_0$, and then the step S21 is repeated until the melting enthalpy $\Delta H_n$ of the sample No. n that taken from the residual aqueous system of industrial grade hydrated salts or the residual industrial grade hydrated salts system with mass $m_n$ satisfies $\Delta H_1 < \Delta H_2 < \ldots < \Delta H_n > \Delta H_{n+1}$, or the difference between $\Delta H_n$ and $\Delta H_{GR}$ is in the range of −5 to 5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n≥2.

5. The method according to claim 1, wherein the method comprises:

S21: the residual industrial grade hydrated salt aqueous solution system or residual industrial grade hydrated salt system of mass $m_1$ in step S1 is subjected to melting and diluting with water to increase the mass by 0.4-0.8% of $m_0$, after which the sample No. 2 is taken for DSC testing and the melting enthalpy of the sample No. 2 is recorded as $\Delta H_2$ and the mass of the residual industrial grade hydrated salt aqueous solution system or residual industrial grade hydrated salt system is recorded as $m_2$; and S22: when $\Delta H_1 > \Delta H_2$, the residual industrial grade hydrated salt aqueous solution system or the residual industrial grade hydrated salt system with mass $m_2$ is subjected to melting and evaporating until the mass of the system is reduced by 0.4-0.8% $m_0$; then the melting and evaporating is repeated until the melting enthalpy $\Delta H_n$ of the sample No. n that taken from the residual industrial grade hydrated salt aqueous solution system or the residual industrial grade hydrated salt system with mass $m_n$ satisfies $\Delta H_2 < \Delta H_3 < \ldots < \Delta H_n > \Delta H_n+1$, or the difference between $\Delta H_n$ and $\Delta H_{GR}$ is in the range of −5 to 5 J/g, where the residual aqueous system of industrial grade hydrated salts or the residual industrial grade hydrated salts system with the mass of $m_n$ is confirmed to be an industrial hydrated salts system with improved phase change thermal energy storage performance, with $\Delta H_n$ being the melting enthalpy of sample No. n+1, n≥3.

6. The method according to claim 1, wherein the heating or heating and melting in step S1 is carried out at temperatures in a range of 95 to 125 degree Celsius (° C.).

7. The method according to claim 1, wherein the industrial grade hydrated salts include any one selected from, a group of, bischofite, sodium acetate trihydrate, calcium chloride hexahydrate, magnesium nitrate hexahydrate.

8. The method according to claim 7, wherein the industrial grade hydrated salt is bischofite.

9. The method according to claim 1, wherein the mass of any of the sample from sample No. 1 to sample No. n+1 is in a range of 0.1 g to 0.3 g.

10. The method according to claim 1, wherein the method further comprises: dissolving an industrial bischofite of a mass of 105-130% $m_0$ in water, and then filtering the water dissolved with industrial bischofite to form the aqueous system of industrial grade hydrated salts.

11. The method according to claim 1, wherein the method further comprises: heating the aqueous system of industrial grade hydrated salts to above 95° C. and evaporating the aqueous system of industrial grade hydrated salts with constant stirring to reduce its mass to $m_0$.

* * * * *